US012640525B2

(12) United States Patent
Zhang et al.

(10) Patent No.: US 12,640,525 B2
(45) Date of Patent: May 26, 2026

(54) CONNECTOR AND ELECTRONIC DEVICE

(71) Applicant: Huawei Digital Power Technologies Co., Ltd., Shenzhen (CN)

(72) Inventors: Xiufeng Zhang, Dongguan (CN); Yongbing Gao, Shanghai (CN); Maofan Li, Dongguan (CN); Xuedong Deng, Shenzhen (CN); He Chen, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 502 days.

(21) Appl. No.: 18/152,898

(22) Filed: Jan. 11, 2023

(65) Prior Publication Data

US 2023/0187884 A1 Jun. 15, 2023

Related U.S. Application Data

(63) Continuation of application No. PCT/CN2021/099009, filed on Jun. 8, 2021.

(30) Foreign Application Priority Data

Jul. 13, 2020 (CN) ........................ 202010670864.X

(51) Int. Cl.
*H01R 13/74* (2006.01)
*H01R 12/58* (2011.01)
(Continued)

(52) U.S. Cl.
CPC ........... *H01R 13/746* (2013.01); *H01R 12/58* (2013.01); *H01R 12/707* (2013.01); *H01R 13/5202* (2013.01); *H01R 13/622* (2013.01)

(58) Field of Classification Search
CPC .... H01R 13/746; H01R 12/58; H01R 12/707; H01R 13/5202; H01R 13/622;
(Continued)

(56) References Cited

U.S. PATENT DOCUMENTS 5,273,443 A * 12/1993 Frantz .................. H01R 13/424 439/744
5,571,033 A * 11/1996 Kinsey, Jr. ............. H01R 13/41 439/444

(Continued)

FOREIGN PATENT DOCUMENTS

BR 112012017878 B1 * 9/2020 ............. H05K 9/006
CH 705665 A1 4/2013

(Continued)

*Primary Examiner* — Travis S Chambers
(74) *Attorney, Agent, or Firm* — Maier & Maier, PLLC

(57) ABSTRACT

A connector and an electronic device, to resolve a problem of poor mountability of the connector. The connector includes a housing, a conductive core, and a fastening structure. The housing has a channel that passes through a first end and a second end of the housing. The conductive core is disposed in the channel. A solder leg is disposed on one end of the conductive core, and the solder leg protrudes from the first end of the housing and is configured to be soldered to a circuit board. The fastening structure is configured to fasten the housing to a panel. The conductive core may be directly soldered to the circuit board, so that a connection effect between the conductive core and the circuit board can be improved, and mounting steps can be reduced.

18 Claims, 7 Drawing Sheets

(51) Int. Cl.

| | |
|---|---|
| ***H01R 12/70*** | (2011.01) |
| ***H01R 13/52*** | (2006.01) |
| ***H01R 13/622*** | (2006.01) |

(58) Field of Classification Search
CPC .. H01R 12/7052; H01R 12/716; H01R 13/02; H01R 12/55; B25B 13/485; H02S 40/34
See application file for complete search history.

(56) References Cited

U.S. PATENT DOCUMENTS

| | | | | |
|---|---|---|---|---|
| 7,708,586 | B1 * | 5/2010 | Rohde | H01R 13/746 439/490 |
| 8,636,522 | B2 * | 1/2014 | Sykes | H01R 9/0515 439/63 |
| 2002/0076978 | A1 * | 6/2002 | Meyer | H01R 24/52 439/551 |
| 2015/0104965 | A1 | 4/2015 | Takagi | |
| 2015/0147911 | A1 * | 5/2015 | Logan, Jr. | H01R 12/91 29/842 |
| 2017/0110224 | A1 | 4/2017 | Kim | |

FOREIGN PATENT DOCUMENTS

| | | | | |
|---|---|---|---|---|
| CN | 201234037 | Y | 5/2009 | |
| CN | 201565873 | U | 9/2010 | |
| CN | 201669638 | U | 12/2010 | |
| CN | 202780947 | U | 3/2013 | |
| CN | 103117460 | A | 5/2013 | |
| CN | 105281115 | A | 1/2016 | |
| CN | 205752631 | U | 11/2016 | |
| CN | 103050559 | B | 12/2016 | |
| CN | 207098227 | U | 3/2018 | |
| CN | 207509103 | U | 6/2018 | |
| CN | 208240908 | U | 12/2018 | |
| CN | 109962368 | A | 7/2019 | |
| CN | 111244670 | A | 6/2020 | |
| CN | 112003051 | A | 11/2020 | |
| DE | 29509854 | U1 | 8/1995 | |
| DE | 29605985 | U1 | 6/1996 | |
| DE | 102009056714 | A1 | 6/2011 | |
| DE | 102011112283 | A1 | 3/2013 | |
| DE | 102012014695 | A1 | 1/2014 | |
| EP | 1901399 | A1 * | 3/2008 | H01R 13/432 |
| JP | 2013157175 | A | 8/2013 | |
| JP | 5562157 | B2 | 7/2014 | |
| WO | 2014092144 | A1 | 6/2014 | |
| WO | WO-2022233188 | A1 * | 11/2022 | H01R 13/502 |

* cited by examiner

CONNECTOR AND ELECTRONIC DEVICE

CROSS-REFERENCE TO RELATED APPLICATIONS

This application is a continuation of International Application No. PCT/CN2021/099009, filed on Jun. 8, 2021, claims priority to Chinese Patent Application No. 202010670864.X, filed on Jul. 13, 2020. The disclosures of the aforementioned applications are hereby incorporated by reference in their entireties.

TECHNICAL FIELD

The embodiments relate to the field of connector technologies, a connector that is easy to mount, and an electronic device.

BACKGROUND

Connectors are widely used in electronic devices, to enable two or more electronic devices to be electrically connected. For purposes such as quick disassembly and assembly, connectors are generally used in pairs. For example, in a photovoltaic system, electric energy of a photovoltaic battery needs to be transmitted to an inverter, to implement current inversion, and provide the electric energy for a terminal user or a power grid. A male connector may be mounted at the photovoltaic battery end, and a female connector may be mounted at the inverter end. After the male connector is connected to the female connector, the photovoltaic battery may be electrically connected to the inverter. In actual application, at the inverter end, a conductive core of the connector is electrically connected to a circuit board inside the inverter by using a cable. Because the cable needs to be electrically connected to both the conductive core and the circuit board, mounting steps are complex, and a problem of connection reliability is easy to occur.

SUMMARY

The embodiments may provide a connector that is conducive to improving mounting convenience and a mounting effect, and an electronic device that has the connector.

According to an aspect, the embodiments may provide a connector, including a housing, a conductive core, and a fastening structure. The housing has a channel that passes through a first end and a second end of the housing. The conductive core is disposed in the channel. A solder leg is disposed on one end of the conductive core, and the solder leg protrudes from the first end of the housing. The housing is fastened to a panel by using the fastening structure. The conductive core may be directly soldered to a circuit board, so that a connection between the conductive core and the circuit board can be improved and mounting steps can be reduced.

In configuration, the fastening structure may be a nut and a shoulder. An external thread and the shoulder may be disposed on an outer peripheral surface of the housing, and the nut may be sleeved on an outer periphery of the housing and thread-connected to the external thread. When the nut is tightened, the nut may gradually move in a direction of the housing panel, so that the housing panel is clamped and fastened between the nut and the shoulder.

To rotate the nut well, an operator may rotate the nut by using a tool. A protrusion or a groove may be disposed on the tool, a groove or a protrusion may be disposed on an end face of the nut, and the end face may be an end face that faces away from the shoulder. The protrusion or the groove on the tool is configured to be inserted into the groove or the protrusion on the nut. The operator may rotate the nut by rotating the tool. Because the foregoing groove or protrusion structure is disposed on the end face of the nut, the tool can rotate the nut by acting on the nut from one end of the nut. Therefore, when a plurality of connectors are disposed, a distance between adjacent connectors may be reduced as much as possible. In other words, operation space used to rotate the nut does not need to be reserved between the adjacent connectors, to facilitate a compact layout of the connectors.

The tool may be of a cylindrical structure and the protrusion or the groove on the tool may be disposed on one end face of the cylindrical structure.

In addition, space inside an electronic device may be limited. Therefore, for ease of mounting, the nut is farther away from the first end of the housing than the shoulder. The first end of the housing and the shoulder may be both located inside (or an inner side of the housing panel) the electronic device, and the nut may be located outside (or an outer side of the housing panel) the electronic device. The nut may be mounted on the housing of the connector from the outside of the electronic device, so that the tool can have large operation space in a process of mounting the nut.

To improve relative stability between the tool and the nut, a plurality of grooves or protrusions may be disposed on the nut, and the plurality of grooves or protrusions may be evenly distributed around an axis of the nut. Correspondingly, a plurality of protrusions or grooves may also be correspondingly disposed on the tool, and the plurality of protrusions or grooves may also be evenly distributed around an axis of the tool.

In addition, to improve stability existing when the shoulder abuts against the housing panel, the shoulder may be configured as a flange that extends around the outer periphery of the housing.

A sealing ring may be further disposed between the shoulder and the housing panel. When the connector is mounted on the housing panel, the sealing ring is tightly clamped between the shoulder and the housing panel, so that tightness between the connector and the housing panel can be improved.

To improve connection stability between the connector and the circuit board, a positioning rod may be disposed on an end face of the first end of the housing. Correspondingly, a positioning hole may be disposed on the circuit board, and the positioning rod may be inserted into the positioning hole, to avoid a radial (a direction perpendicular to a central axis of the positioning hole) position offset between the circuit board and the connector. Based on the foregoing connection manner of the positioning rod and the positioning hole, connection strength between the connector and the electronic device may be effectively improved, and stress exerted by the circuit board on the solder leg can be further shared. Therefore, connection stability between the conductive core and the circuit board is effectively ensured, and looseness or mutual detachment between the solder leg and the circuit board is avoided. In configuration, the positioning rod and the positioning hole may be assembled by using an interference fit, to improve connection stability between the housing and the circuit board. In addition, a quantity of positioning rods and a quantity of positioning holes may be adaptively adjusted based on an actual requirement. This is not limited.

In addition, to improve connection reliability between the connector and the electronic device, the conductive core is slidably disposed in the channel. In other words, the conductive core may axially slide a preset distance relative to the housing, and the distance may be used to compensate for a mounting error that is generated when the connector is mounted on the electronic device. When a dimension error occurs in any one part in the housing panel, the housing of the connector, the circuit board, and the conductive core, the distance may be used to compensate for the dimension error, so that a fault tolerance rate and mounting reliability of the foregoing part during manufacturing and assembly can be improved.

The connector may not only need to be connected to the electronic device, but may also need to be electrically connected to another electronic device or a cable, so that the electronic device and the another electronic device or the cable are connected. To implement a quick connection, a connector (an external connector) that is configured to adapt to the connector may also be disposed on the another electronic device or the cable.

To enable the connector to be connected to the external connector, a first connection portion may be disposed on the housing of the connector. In configuration, the first connection portion may be a structure such as a snap hook or a snap hole. When the external connector has a snap hook structure, a snap hole that is configured to be clamped with the snap hook structure may be disposed on the housing of the connector. Correspondingly, when the external connector has a snap hole structure, a snap hook that is configured to be clamped with the snap hole structure may be disposed on the housing of the connector. It may be understood that, in configuration, a structural type of the first connection portion may not be limited to the snap hook or the snap hole.

In addition, to enable to the connector to be electrically connected to the external connector, the conductive core may further include a second connection portion, and the second connection portion is configured to be connected to a conductive structure of the external connector, so that the connector and the external connector are conductively connected.

In an implementation, after the conductive structure of the external connector is connected to the second connection portion, the conductive core may be subjected to large force. To prevent the force from being transmitted to the solder leg and therefore affecting connection reliability between the solder leg and the circuit board, a flexible portion is further disposed between the second connection portion and the solder leg. After the second connection portion is subjected to force of the external connector (the conductive structure of the connector), the flexible portion may buffer or weaken, through deformation of the flexible portion, the force that is transmitted to the solder leg, so that connection reliability between the solder leg and the circuit board can be improved.

According to another aspect, the embodiments may further provide an electronic device, including a housing panel and a circuit board, and further including the foregoing connector. A through hole is disposed on the housing panel, and a housing of the connector passes through the through hole. The circuit board and a first end of the housing of the connector are located on a same side of the housing panel, and a second end of the housing is located on the other side of the housing panel.

In actual application, the electronic device may have various types. For example, the electronic device may be an inverter, a cabinet, or the like. The inverter is used as an example. The inverter is a converter that converts direct current power into constant-frequency and constant-voltage or variable-frequency and variable-voltage alternating current power. The inverter may include a functional circuit such as a filter circuit, a measurement circuit, and an inverter circuit, and the foregoing functional circuit may be integrated into the circuit board. When the inverter is applied to a photovoltaic system, the circuit board of the inverter may be electrically connected to a photovoltaic battery in the photovoltaic system by using the connector. Direct current power in the photovoltaic battery may be processed by using the functional circuit such as a filter circuit, a measurement circuit, and an inverter circuit that are integrated into the circuit board, so that the direct current power is converted into alternating current power, and the alternating current power is transferred to a user end or a power grid.

DETAILED DESCRIPTION OF THE EMBODIMENTS

To make objectives, solutions, and advantages clearer, the following further describes the embodiments in detail with reference to the accompanying drawings.

To facilitate understanding of a connector provided in the embodiments, the following first describes an application scenario of the connector.

A connector may be applied to a plurality of electronic devices, to enable the electronic device and another electronic device or an external cable to be electrically connected. An example in which the electronic device is an inverter is used. The inverter is a converter that converts direct current power into constant-frequency and constant-voltage or variable-frequency and variable-voltage alternating current power. The inverter may be applied to a photovoltaic system, to convert direct current power in a photovoltaic battery into alternating current power.

Figure 1:
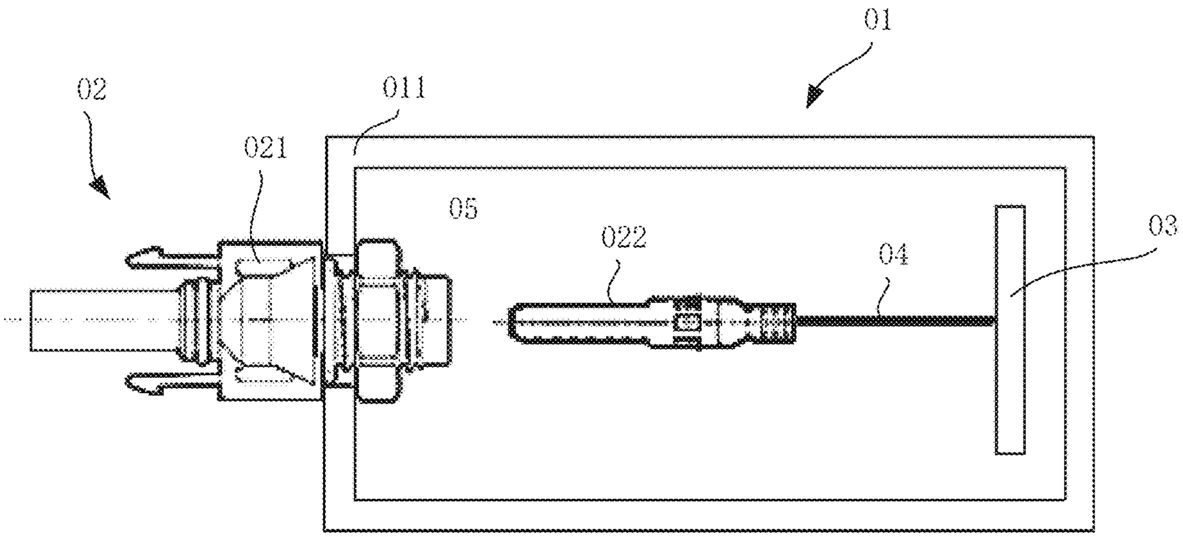
FIG. 1 (prior art)
FIG. 1 is a schematic diagram of assembly between a connector and an inverter according to an embodiment.

As shown in FIG. 1, to facilitate an electrical connection between an inverter 01 and a photovoltaic battery (not shown in the figure), a connector 02 may be mounted on a housing panel 011 of the inverter 01, and a photovoltaic string cable of the photovoltaic battery may be connected to the connector 02 (a connector that is configured to be connected to the connector 02 may be disposed on the photovoltaic string cable). A functional circuit 03 such as a filter circuit, a measurement circuit, and an inverter circuit may be mounted inside the inverter 01. One end of the connector 02 is electrically connected to the functional circuit 03 by using a cable 04, and the other end of the connector 02 may be connected to the photovoltaic string cable. Direct current power in the photovoltaic battery is supplied to the functional circuit 03 inside the inverter 01 after the direct current power passes through the photovoltaic string cable and the connector 02. The functional circuit 03 performs processing such as filtering, measurement, and inversion on the direct current power, and finally outputs alternating current power.

In actual application, the connector 02 not only needs to have reliable electrical connection performance and dust-proof and water-proof performance, but also needs to have good mountability.

Currently, in terms of an electrical connection, there are many mountability problems between a conductive structure in the connector 02 and the functional circuit 03 in the inverter 01. Briefly, the functional circuit 03 such as a filter circuit, a measurement circuit, and an inverter circuit inside the inverter 01 is generally integrated into and mounted on a circuit board (for example, a printed circuit board), and the connector 02 is generally electrically connected to the functional circuit 03 by using the cable 04. The connector 02 may include a housing 021 and a conductive core 022 (the conductive core 022 and the housing 021 are separated in the figure) that is disposed inside the housing 021. During mounting, the conductive core 022 needs to be crimped to the left end of the cable 04 (for example, the conductive core 022 and the cable 04 are tightly crimped by using a crimping tool, so that the conductive core 022 and the cable 04 are electrically and fixedly connected). The right end of the cable 04 is connected to the circuit board by using a connection terminal (for example, an OT terminal, also referred to as a circular cold-pressed terminal), so that the connector 02 and the circuit board are electrically connected. In the foregoing mounting process, the connector 02 and the functional circuit 03 can be electrically connected only by using the connection terminal and a crimping process. As a result, there are a large quantity of mounting processes, and it is not conducive to improving mounting efficiency. In addition, the additional cable 04 is further required when the connector 02 and the functional circuit 03 are connected. When a quantity of connectors 02 is large, a quantity of cables 04 that need to be used is significantly increased. Consequently, a great difficulty is caused to a cabling design and assembly work of the inverter 01.

In addition, in terms of a mechanical connection, there are also many mountability problems between the connector 02 and the inverter 01. A through hole (not shown in the figure) through which the housing 021 of the connector 02 passes is generally disposed on the housing panel 011 of the inverter 01. After the housing 021 passes through the through hole from the outside (the left side in the figure) of the housing panel 011, a nut 05 is thread-connected to the right end of the housing 021, so that the housing panel 011 near the through hole is clamped and fastened between the housing 021 and the nut 05. In the foregoing mounting manner, the housing 021 of the connector 02 needs to be mounted from the outside of the housing panel 011 of the inverter 01. Therefore, the conductive core 022 can be inserted into and fastened to the housing 021 only after the housing 021 of the connector 02 is fixedly connected to the housing panel 011. Otherwise, blocking interference is generated between the cable 04 and the housing panel 011. When the conductive core 022 is inserted into and fastened to the housing 021, a device such as the functional circuit 03 located inside the housing panel 021 may be close to the connector 02. As a result, a mounting tool may be blocked, and a problem such as a mounting difficulty is caused.

In conclusion, when the connector 02 and the inverter 01 are mounted, because of a plurality of mounting processes and a great mounting difficulty, mounting efficiency and connection reliability are significantly reduced.

Therefore, the embodiments may provide a connector that is conducive to reducing a mounting difficulty and improving mounting efficiency.

To make the objectives, solutions, and advantages clearer, the following further describes the embodiments in detail with reference to the accompanying drawings.

Terms used in the following embodiments are merely intended to describe the embodiments, but are not intended as limiting. As used herein, the singular expressions "a", "a", "the above", "the" and "this" are not in a particular sense or limitation and are intended to also include expressions such as "one or more", unless the contrary is clearly indicated in its context. It should be further understood that in the following embodiments, "at least one" and "one or more" refer to one, two, or more. The term "and/or" is used to describe an association relationship between associated objects and indicates that there may be three relationships. For example, A and/or B may represent a case in which only A exists, both A and B exist, and only B exists, where A and B may be singular or plural. The character "/" generally indicates an "or" relationship between the associated objects.

Reference to "one embodiment" or "some embodiments" or the like means that one or more embodiments include a particular feature, structure, or characteristic described in combination with the embodiment. Thus, phrases "in one embodiment", "in some embodiments", "in some other embodiments", "in some additional embodiments", and the like that appear do not necessarily mean referring to a same embodiment, but mean "one or more embodiments, but not all embodiments", unless otherwise emphasized. The terms "include", "contain", "have", and their variants all mean "include but are not limited to", unless otherwise emphasized.

Figure 2:
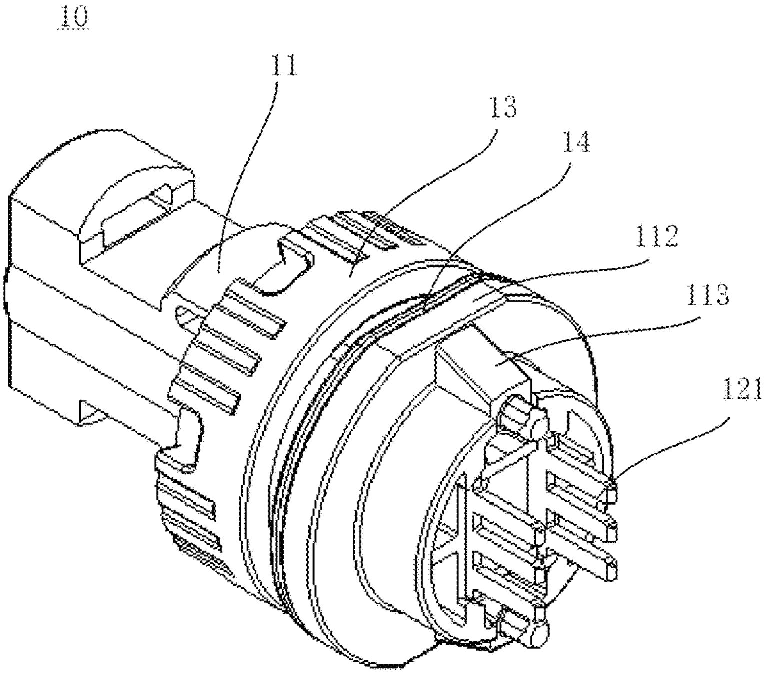
FIG. 2 is a schematic diagram of a three-dimensional structure of a connector according to an embodiment.
Figure 3:
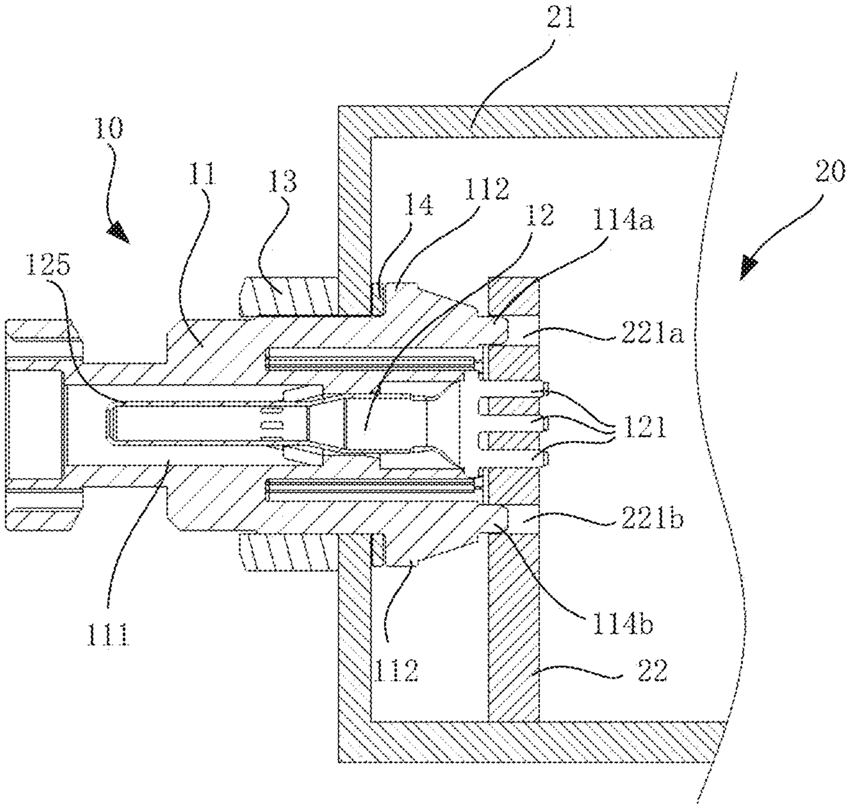
FIG. 3 is a schematic diagram of a cross-sectional structure of a connector that is assembled to an electronic device according to an embodiment.

As shown in FIG. 2 and FIG. 3, in an embodiment, a connector 10 includes a housing 11, a conductive core 12, and a nut 13. As shown in FIG. 3, the housing 11 has a channel 111 that passes through a first end (the right end in the figure) and a second end (the left end in the figure) of the housing 11, and the channel 111 is configured to mount the conductive core 12. A solder leg 121 is disposed on one end (the right end in the figure) of the conductive core 12, and the solder leg 121 protrudes from the first end of the housing 11. The solder leg 121 is configured to be soldered to a circuit board 22, so that the conductive core 12 and the circuit board 22 are electrically and fixedly connected. A through hole (not shown in the figure) is disposed on a housing panel 21 of an electronic device 20, the housing 11 of the connector 10 may pass through the through hole from the right to the left of an inner side of the housing panel 21, and a shoulder 112 on an outer periphery of the housing 11 may abut against the housing panel 21 near the through hole, to implement positioning between the housing 11 and the housing panel 21. The nut 13 is sleeved on the outer periphery of the housing 11 from the left end of the housing 11. When the nut 13 is gradually tightened with the housing 11, the right end of the nut 13 abuts against an outer side of the housing panel 21, and the left end of the shoulder 112 abuts against the inner side of the housing panel 21, so that the housing panel 21 is clamped and fastened between the nut 13 and the shoulder 112, to implement relative fastening between the housing 11 and the housing panel 21. The circuit board 22 inside the electronic device 20 may be electrically connected to another external device or a cable by using the conductive core 12 of the connector 10, to meet a requirement of a quick connection between the electronic device 20 and the another external device or the cable.

When the connector 10 and the electronic device 20 are mounted, the solder leg 121 of the conductive core 12 may be soldered to the circuit board by using a soldering process such as wave soldering. Next, the housing 11 of the connector is sleeved on an outer periphery of the conductive core 12 from the left to the right, so that the conductive core 12 is inserted into the channel 111. Then, the conductive core 12, the housing 11, and the circuit board 22 are mounted in the housing panel 21 as a whole, so that the left end of the housing 11 protrudes from the housing panel 21. Finally, the nut 13 is tightened from the left end of the housing 11 to the right, to implement assembly between the connector 10 and the electronic device 20.

According to the connector 10, the conductive core 12 may be directly soldered to the circuit board 22, so that a connection effect and connection convenience between the conductive core 12 and the circuit board 22 can be improved. After the conductive core 12 is soldered to the circuit board 22, the housing 11 of the connector 10 may be sleeved on and fastened to the outer periphery of the conductive core 12, so that the housing 11 of the connector 10, the conductive core 12, and the circuit board 22 are mounted on the inner side of the housing panel 21 as a whole, and an assembly process can be simplified. When a quantity of connectors 10 is large, this advantage becomes more distinct, so that assembly efficiency can be significantly improved. In addition, the nut 13 may be mounted on the housing 11 of the connector from the outside of the housing panel 21. Therefore, operation space during mounting is abundant.

As shown in FIG. 3, in configuration, to improve dust-proof and water-proof performance between the connector 10 and the housing panel 21, a sealing ring 14 may be disposed between the shoulder 112 and the housing panel 21. After the nut 13 is tightened, the sealing ring 14 is tightly clamped between the shoulder 112 and the housing panel 21, to prevent impurities such as dust and moisture from entering the electronic device.

In an implementation, the shoulder 112 may have various shape structures. For example, as shown in FIG. 2, in the embodiment, the shoulder 112 is configured as a flange structure that extends outwardly around the outer periphery of the housing 11. It may be understood that a cross-sectional outer contour of the shoulder 112 may be a circular shape, a rectangular shape, an elliptical shape, or the like. This is not limited.

As shown in FIG. 2, to improve stress performance of the shoulder 112, in the embodiment, a reinforcing rib 113 is further disposed on one side of the shoulder 112. When the shoulder 112 closely abuts against the sealing ring 14, the reinforcing rib 113 may effectively improve the stress performance of the shoulder 112, may prevent the shoulder 112 from being significantly deformed or even broken, and may further effectively improve fitness between the shoulder 112 and the sealing ring 14, to help ensure dust-proof and water-proof performance of the connector 10.

As shown in FIG. 3, to improve connection stability between the connector 10 and the circuit board 22, in an embodiment, a positioning rod 114*a* and a positioning rod 114*b* are disposed on an end face of the first end (the right end in the figure) of the housing 11. Correspondingly, a positioning hole 221*a* and a positioning hole 221*b* are disposed on the circuit board 22. The positioning rod 114*a* may be inserted into the positioning hole 221*a*, and the positioning rod 114*b* may be inserted into the positioning hole 221*b*, to avoid a radial (a direction perpendicular to a central axis of the positioning hole) position offset between the circuit board 22 and the housing 11. Based on the foregoing connection manner of the positioning rod 114*a*, the positioning rod 114*b*, the positioning hole 221*a*, and the positioning hole 221*b*, connection strength between the housing 11 and the circuit board 22 may be effectively improved, and stress exerted by the circuit board 22 on the solder leg 121 can be further shared. Therefore, connection stability between the conductive core 12 and the circuit board 22 is effectively ensured, and looseness or mutual detachment between the solder leg 121 and the circuit board 22 is avoided. In configuration, the positioning rod 114*a* and the positioning hole 221*a* may be assembled by using an interference fit, and the positioning rod 114*b* and the positioning hole 221*b* may be assembled by using an interference fit, to improve connection stability between the housing 11 and the circuit board 22. In addition, a quantity of positioning rods and a quantity of positioning holes may be adaptively adjusted based on an actual requirement. This is not limited.

In addition, in an implementation, to enable the connector to be electrically connected to an external connector, according to the connector provided in the embodiment, the conductive core 12 further includes a second connection portion 125 that is configured to be connected to a conductive structure of the external connector. The second connection portion 125 may have a columnar structure and may be located at the left end of the conductive core 12, and the conductive structure of the external connector may be sleeved on an outer periphery of the second connection portion 125, so that the second connection portion 125 and the conductive structure of the external connector are connected. After the conductive structure of the external connector is connected to the second connection portion 125, stress may exist between the conductive structure of the external connector and the second connection portion 125. To prevent the stress from being transmitted to the solder leg 121 and therefore affecting connection reliability between the solder leg 121 and the circuit board 22, a flexible portion (not shown in the figure) is further disposed between the second connection portion 125 and the solder leg 121. After the second connection portion 125 is subjected to force of the external connector (the conductive structure of the connector), the flexible portion may buffer or weaken, through deformation of the flexible portion, the force that is transmitted to the solder leg 121, so that connection reliability between the solder leg 121 and the circuit board 22 can be improved. In an implementation, a portion that has a small cross-sectional contour may be disposed between the second connection portion 125 and the solder leg 121, and the portion may form the flexible portion. Alternatively, the second connection portion 125 and the solder leg 121 may be connected by using a cable that has good flexibility. When the second connection portion 125 is subjected to external force, the cable may absorb the external force through deformation of the cable, so that the external force can be effectively reduced or prevented from being transmitted to the solder leg 121. It may be understood that, in another implementation, the force between the second connection portion 125 and the solder leg 121 may be buffered by using another structural form. Details are not described herein.

To improve connection reliability between the connector 10 and the electronic device 20, in the embodiment, the conductive core 12 is slidably disposed in the channel 111. In other words, the conductive core 12 may axially (a left-right direction in the figure) slide a preset distance relative to the housing 11, and the distance may be used to compensate for a mounting error that is generated when the connector 10 is mounted on the electronic device 20. When a dimension error occurs in any one part in the housing panel 21, the housing 11 of the connector 10, the circuit board 22, and the conductive core 12, the distance may be used to compensate for the dimension error, so that a fault tolerance rate and mounting reliability of the foregoing part during manufacturing and assembly can be improved.

Figure 4:
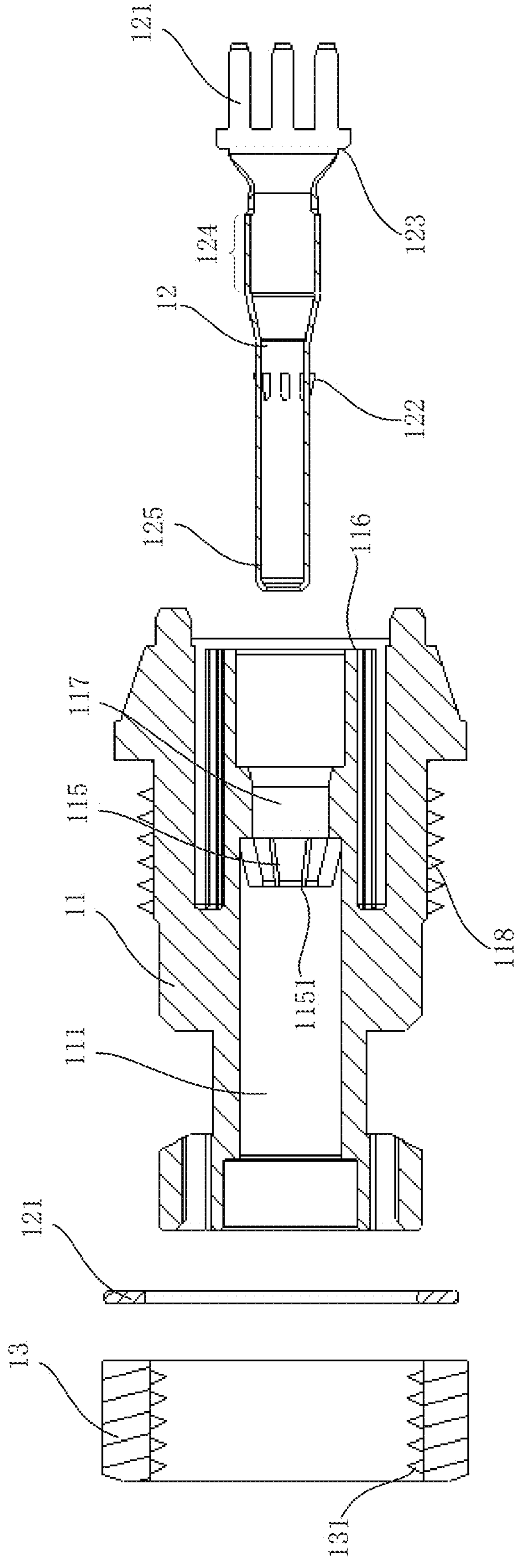
FIG. 4 is a schematic diagram of a cross-sectional structure of a connector in an exploded state according to an embodiment.

As shown in FIG. 4, an outwardly-tilted spring 122 may be disposed on the outer periphery of the conductive core 12 and a horn-shaped opening 115 may be disposed inside the channel 111 of the housing 11. When the conductive core 12 is inserted into the channel 111 from the right to the left, the horn-shaped opening 115 abuts against an outer side of the spring 122, so that the spring 122 is elastically deformed toward an inner side of the conductive core 12. After the conductive core 12 is further pushed to enable the spring 122 to pass through the horn-shaped opening 115, the spring 122 returns to the outwardly-tilted state under an action of elastic force of the spring 122. When the conductive core 12 is pulled to the left, the spring 122 abuts against a left end face 1151 of the horn-shaped opening 115, so that the conductive core 12 can be prevented from being pulled out.

The conductive core 12 may be manufactured by performing processing such as cutting, stamping, and curling on a metal sheet. The spring 122 may be formed by bending a part of the metal sheet outwardly by using a cutting process, and one or more springs 122 may be disposed around an axis of the conductive core 12. This is not limited.

As shown in FIG. 4, to enable the conductive core 12 to axially slide a preset distance relative to the housing 11, in the embodiment, a first abutment surface 116 that faces the right side is disposed in the channel 111, and a second abutment surface 123 that faces the left side is disposed in the conductive core 12. When the spring 122 of the conductive core 12 just passes through the horn-shaped opening 115 and after the conductive core 12 is further inserted by the preset distance, the first abutment surface 116 abuts against the second abutment surface 123, to prevent the conductive core 12 from further moving in an insertion direction. In other words, the spring 122 abuts against the end face 1151 of the horn-shaped opening 115, and the first abutment surface 116 abuts against the second abutment surface 123, so that the conductive core 12 can only move the preset distance relative to the housing 11. It may be understood that, in another implementation, another limiting structure may be disposed in each of the conductive core 12 and the channel 111, to position the conductive core 12 in the channel 111 and may allow the conductive core 12 to slide the preset distance in the channel 111.

In addition, as shown in FIG. 4, to improve relative position precision between the conductive core 12 and the housing 11, in an embodiment, a positioning through hole 117 is disposed in the channel 111 of the housing 11. After the conductive core 12 is inserted into the channel 111, a partial outer peripheral surface 124 of the conductive core 12 and an inner wall of the positioning through hole 117 cooperate with each other, to prevent the conductive core 12 from generating a radial (an up-down direction in the figure) position offset relative to the housing 11. In an implementation, the positioning through hole 117 and the partial outer peripheral surface 124 may be configured by using a clearance fit, so that the conductive core 12 can be smoothly inserted into the channel 111, and the conductive core 12 can be effectively prevented from generating a radial position offset relative to the housing 11.

As shown in FIG. 4, in the embodiment, the housing 11 of the connector 10 is thread-connected to the nut 13. An internal thread 131 may be disposed on an inner periphery of the nut 13 and an external thread 118 may be disposed on the outer periphery of the housing 11. During mounting, the nut 13 may be sleeved on the outer periphery of the housing 11 from the left to the right and may be thread-connected to the housing 11. Therefore, the nut 13 may need to be rotated in this process.

Figure 5:
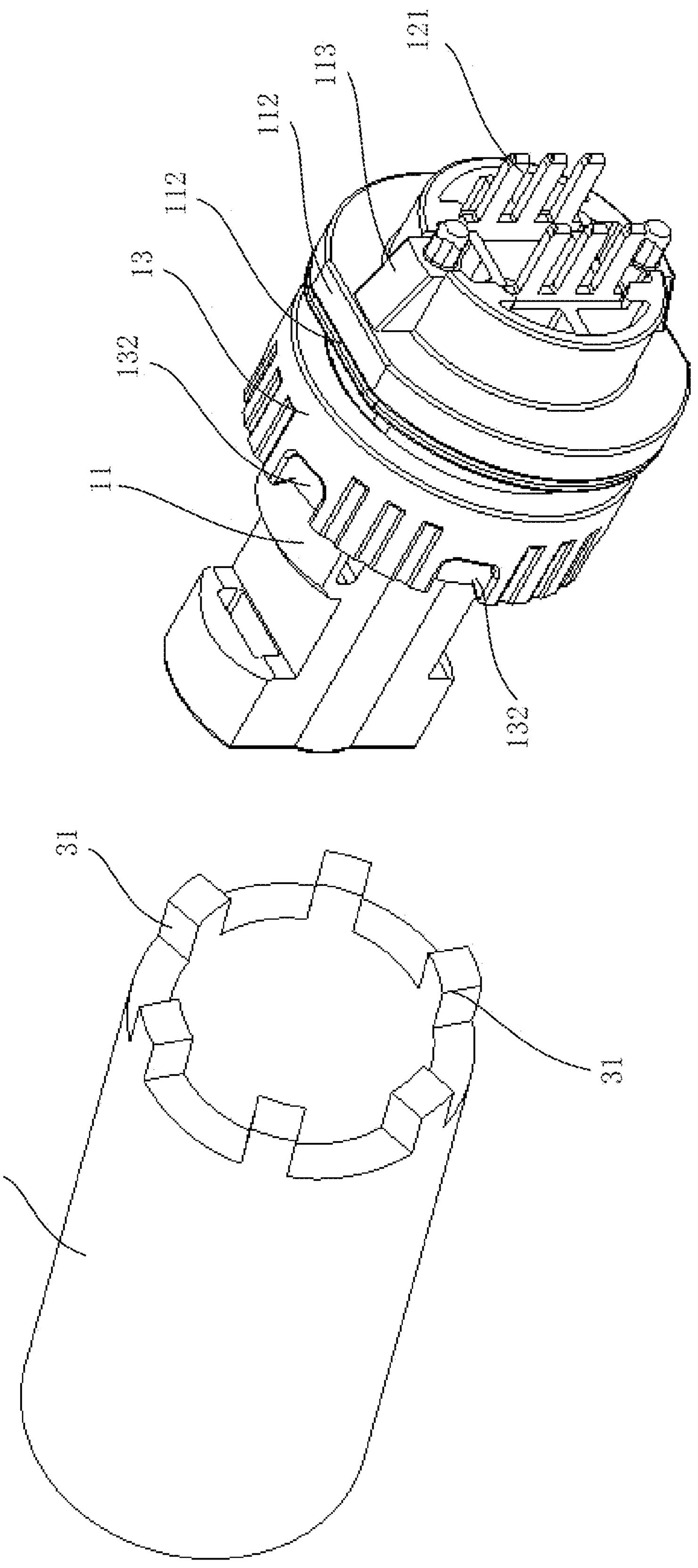
FIG. 5 is a schematic diagram of three-dimensional structures of a connector and a tool according to an embodiment.

As shown in FIG. 5, to better rotate the nut 13, in the embodiment, a tool 30 configured to rotate the nut 13 is further provided. Six protrusions 31 may be disposed on one end (the right end in the figure) of the tool 30 and six grooves 132 (two grooves are shown in the figure) may be disposed on an end face of the nut 13 that faces away from the shoulder 112. The protrusion 31 on the tool 30 may be built into the groove 132 on the nut 13. The nut 13 may be rotated by turning the tool 30 by a hand. An operator may easily rotate the nut 13 by using the tool 30, so that disassembly and assembly work between the nut 13 and the housing 11 is implemented. It may be understood that, in another implementation, a protrusion may be disposed on the end face of the nut 13, and a groove may be disposed on one end (the right end in the figure) of the tool 30. Alternatively, other structures that adapt to each other may be disposed on the end face of the nut 13 and one end of the tool 30, so that the tool 30 can act on the end face of the nut 13, and the nut 13 is rotated together with the tool 30.

Figure 6:
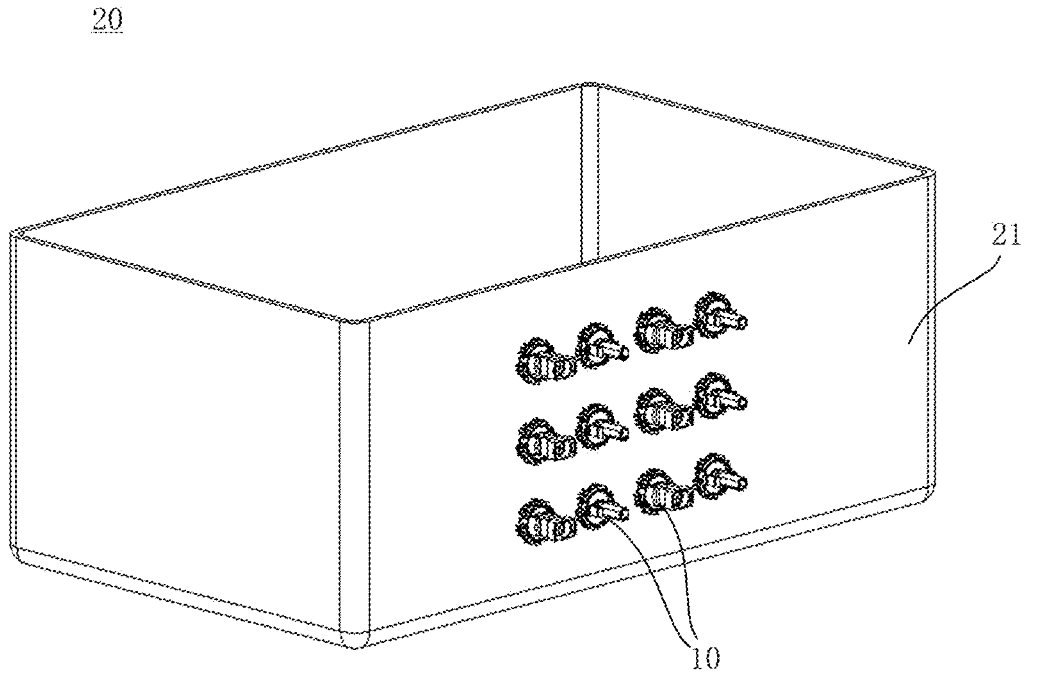
FIG. 6 is a schematic diagram of a three-dimensional structure of an electronic device according to an embodiment.

With reference to FIG. 6, when a plurality of connectors 10 may be mounted on the housing panel 21, to increase a layout density of the connector 10, a distance between adjacent connectors 10 may be reduced as much as possible. Because a conventional nut (for example, a hexagonal nut) may need to be rotated by using a conventional wrench, a large operation space may need to be reserved on an outer periphery of the nut. Therefore, a large distance needs to be kept between adjacent connectors 10. Consequently, it is not conducive to increasing the layout density of the connector 10. In the embodiment, the tool 30 may directly act on an end face of the nut 13 that faces away from the housing panel 21 and does not occupy space on the outer periphery of the nut 13. Therefore, it is conducive to reducing the distance between adjacent connectors 10.

In an implementation, the tool 30 may be configured as a cylindrical structure, the nut 13 as a whole may be configured as a ring structure, and an outer diameter of the tool 30 may be less than or equal to an outer diameter of the nut 13, to prevent the tool 30 from touching the space on the outer periphery of the nut 13 and help further reduce the distance between adjacent connectors 10.

It may be understood that, in some other implementations, the tool 30 is not limited to the cylindrical structure. In addition, a rough pattern structure may be disposed on an outer peripheral surface of the tool 30 to increase friction force of the outer peripheral surface, so that the tool can be effectively rotated by the hand. Alternatively, in some implementations, a structure such as a rotating rod perpendicular to an axis of the tool 30 may be disposed on the tool 30, so that the tool 30 can be easily rotated by the hand by using the rotating rod.

In addition, in another implementation, the nut 13 may be replaced with a fastener such as a snap ring. For example, the snap ring may have a ring structure and the snap ring may be sleeved on the outer periphery of the housing 11 and connected to the housing 11 by using an interference fit. In other words, the snap ring and the housing 11 may be fixedly connected by using an interference fit. During mounting, an end face of the snap ring that faces the housing panel 21 may closely abut against the housing panel 21 as much as possible, to improve tightness between the housing 11 of the connector and the housing panel 21.

In actual application, the connector 10 not only needs to be connected to the electronic device 20, but also needs to be electrically connected to another electronic device or a cable, so that the electronic device 20 and the another electronic device or the cable are connected. To implement a quick connection, a connector that is configured to adapt to the connector 10 may also be disposed on the another electronic device or the cable.

Figure 7:
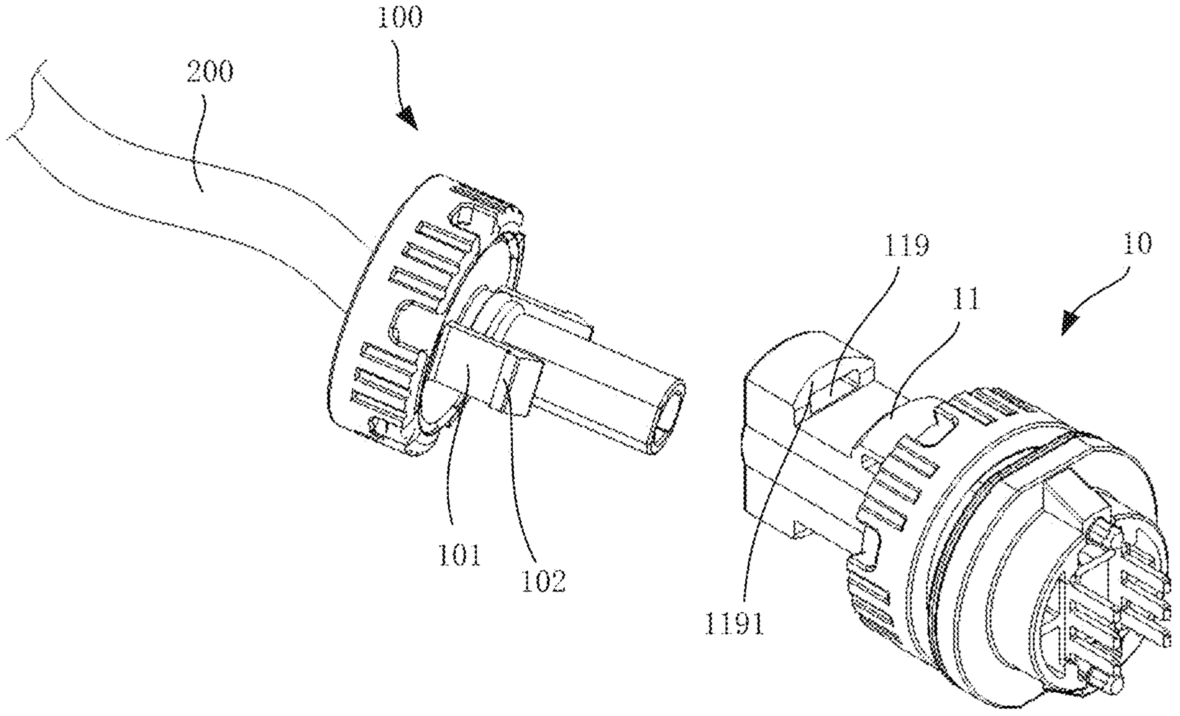
FIG. 7 is a schematic diagram of assembly between a connector and a cable according to an embodiment.

As shown in FIG. 7, the connector 10 may be connected to a cable 200 by using a connector 100. To facilitate a connection between two connectors, in the embodiment, a first connection portion 119 is disposed on the housing 11 of the connector. The first connection portion 119 may include a snap hole, and a snap hook 101 is disposed on a housing of the connector 100. When the connector 10 and the connector 100 are connected to each other, the snap hook 101 of the connector 100 passes through the snap hole on the first connection portion 119, and a rear end face 102 of the snap hook 101 abuts against an end face 1191 of the snap hole 119, to prevent the connector 10 and the connector 100 from being detached from each other, so that the connector 10 and the connector 110 are connected. In configuration, a PV connector currently well-known in the market may be used as the connector 100. Correspondingly, the first connection portion 119 of the connector 10 may be correspondingly adjusted based on a type of the connector 100.

Figure 8:
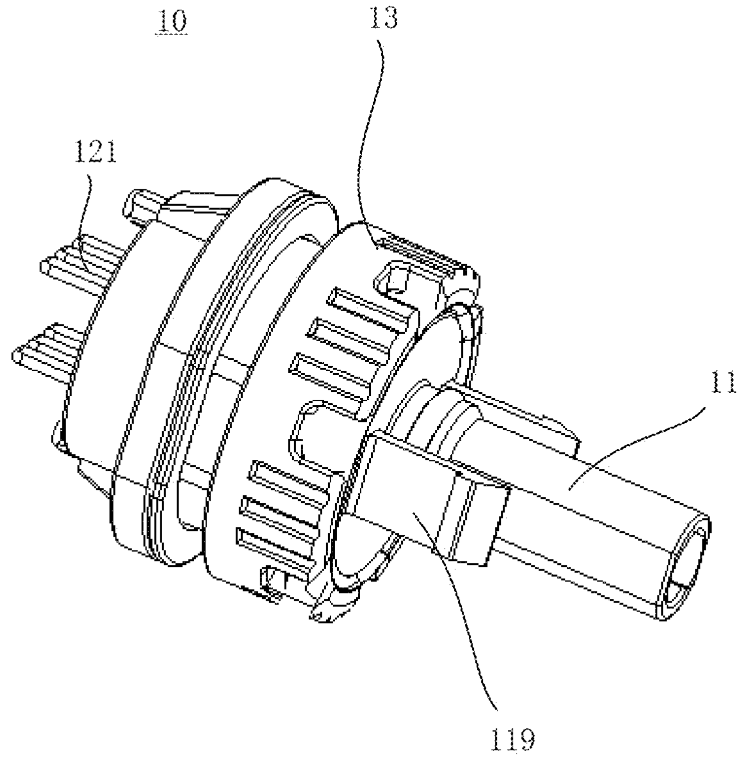
FIG. 8 is a schematic diagram of a three-dimensional structure of another connector according to an embodiment.

For example, when a snap hole structure (in other words, the foregoing snap hook is replaced with the snap hole) is disposed on the connector 100, as shown in FIG. 8, the first connection portion 119 of the connector 10 may be configured as a snap hook structure.

Figure 9:
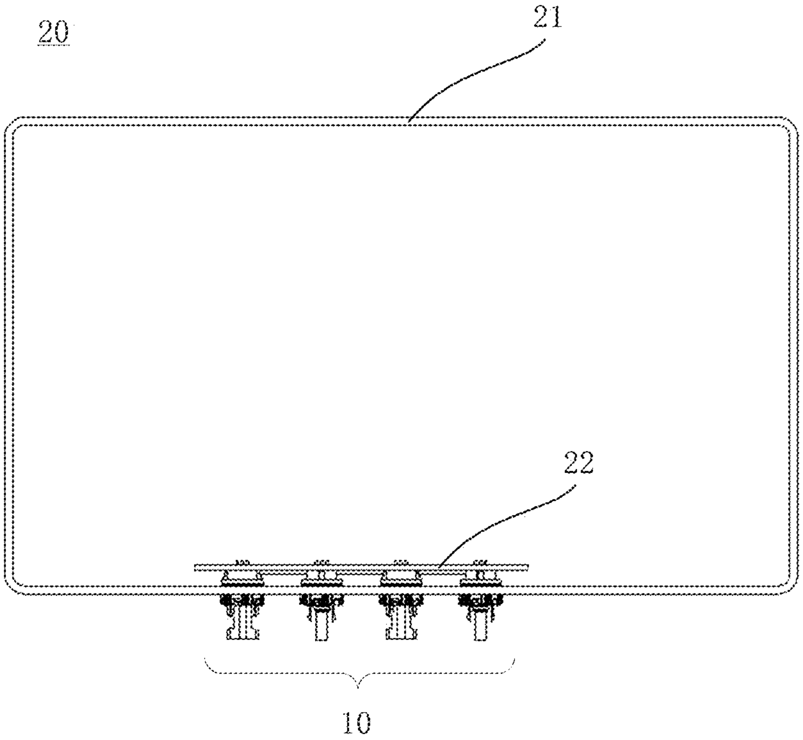
FIG. 9 is a top view of an electronic device according to an embodiment.

In addition, as shown in FIG. 9, an embodiment may further provide an electronic device 20, including a housing panel 21 and a circuit board 22. The housing panel 21 encloses mounting space that is used to accommodate a device such as the circuit board 22. A plurality of the connectors 10 are further mounted in the electronic device 20, so that the electronic device 20 (or the circuit board 22) can be connected to another device or a cable by using the connector 10.

The housing panel 11 may have a plurality of structure compositions.

Figure 10:
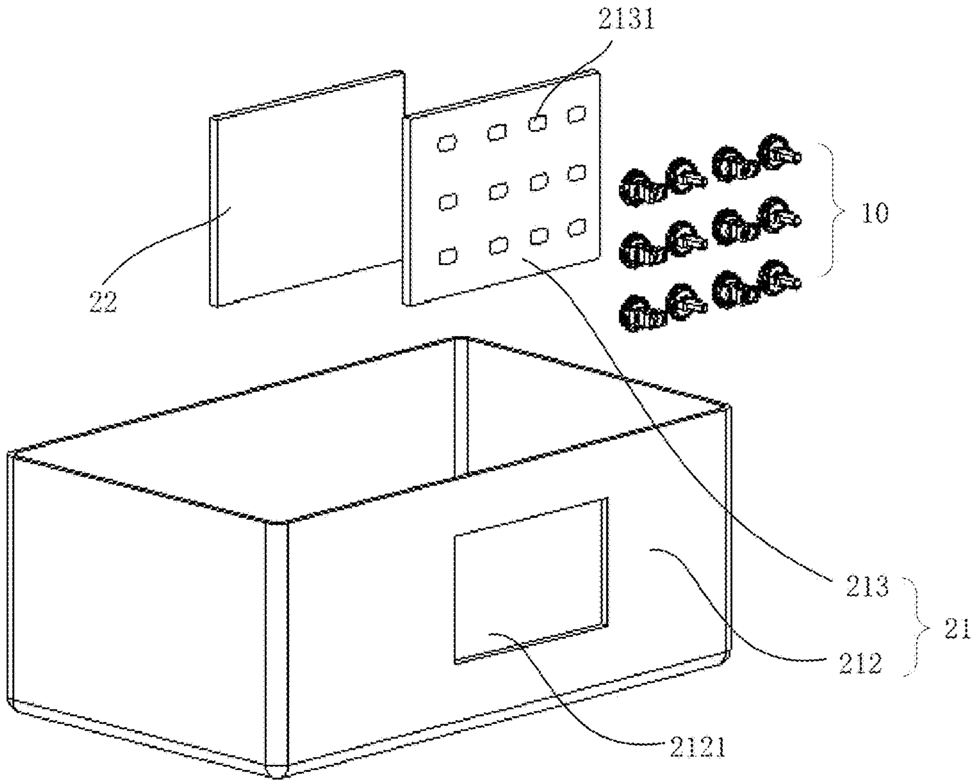
FIG. 10 is a schematic diagram of an exploded structure of an electronic device according to an embodiment.

For example, as shown in FIG. 10, in the embodiment, the housing panel 21 includes a body structure 212 and a mounting plate 213. A hole 2121 is disposed on the body structure 212, and a through hole 2131 through which the connector 10 passes is disposed on the mounting plate 213. The mounting plate 213 may be mounted on the body structure 212 and may seal the hole 2121. When the connector 10 is mounted on the housing panel 21, the plurality of connectors 10 may be first assembled on the mounting plate 213. Next, the connectors 10 are soldered to the circuit board 22. Finally, the mounting plate 213, the circuit board 22, and the plurality of connectors 10 as a whole are fastened to an inner side of the body structure 212 to seal the hole 2121. In an implementation, the mounting plate 213 and the body structure 212 may be fixedly connected to each other through soldering or bonding or by using a screw and the like. Alternatively, in some implementations, the body structure 212 and the mounting plate 213 may be an integral structure. For example, the housing panel 21 may be molded through die-casting molding, stamping molding, or the like, to manufacture the body structure 212 and the mounting plate 213 into an integrally-formed structure member.

Figure 11:
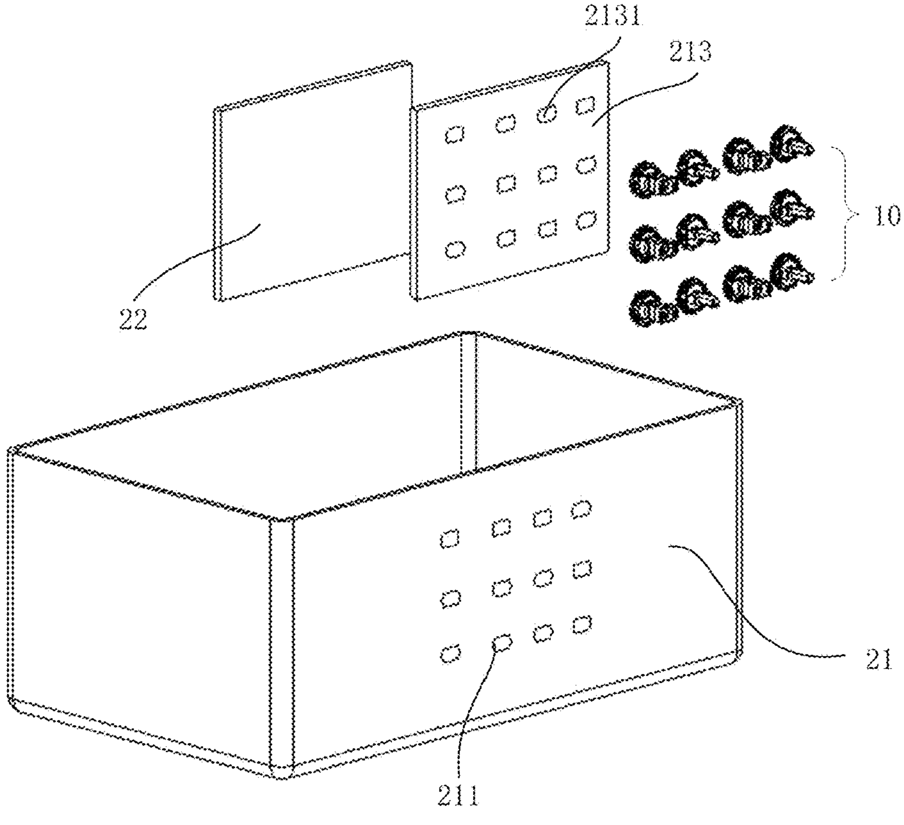
FIG. 11 is a schematic diagram of an exploded structure of another electronic device according to an embodiment.

In addition, as shown in FIG. 11, in some implementations, the mounting plate 213 may also be used as a tool. Before the plurality of connectors 10 may be soldered to the circuit board 22, the plurality of connectors 10 may be first fastened to the mounting plate 213, to effectively position layout positions of the plurality of connectors 10 and facilitate soldering between the connector 10 and the circuit board 22. After the connectors 10 are soldered to the circuit board 20, the mounting plate 213 may be removed, and then an integral structure including the connectors 10 and the circuit board 22 is mounted on the housing panel 21. A plurality of through holes 211 are disposed on the housing panel 21, and the plurality of connectors 10 may respectively pass through corresponding through holes 211.

In actual application, the electronic device 20 may have various types. For example, the electronic device 20 may be an inverter, a cabinet, or the like. The inverter is used as an example. The inverter is a converter that converts direct current power into constant-frequency and constant-voltage or variable-frequency and variable-voltage alternating current power. The inverter may include a functional circuit such as a filter circuit, a measurement circuit, and an inverter circuit, and the foregoing functional circuit may be integrated into the circuit board 22. When the inverter is applied to a photovoltaic system, the circuit board 22 of the inverter may be electrically connected to a photovoltaic battery in the photovoltaic system by using the connector 10. Direct current power in the photovoltaic battery may be processed by using the functional circuit such as a filter circuit, a measurement circuit, and an inverter circuit that are integrated into the circuit board 22, so that the direct current power is converted into alternating current power, and the alternating current power is transferred to a user end or a power grid.

It may be understood that, in actual application, a disposition quantity of connectors 10 and the layout positions thereof may be adaptively adjusted based on an actual situation. This is not limited.

The foregoing descriptions are merely implementations, but are not intended to limit the scope of the embodiments. Any variation or replacement readily figured out by a person skilled in the art shall fall within the scope of the embodiments.

What is claimed is:

1. A connector configured to be mounted on a panel, the connector comprising:

a housing having a channel that passes through a first end and a second end of the housing, wherein a first connection portion is disposed on the second end of the housing and configured to be connected to a second connector; and a conductive core disposed in the channel, wherein a solder leg is disposed on a first end of the conductive core and protrudes from the first end of the housing, and is configured to be soldered to a circuit board; and a fastening structure configured to fasten the housing to the panel, wherein an outwardly-tilted spring is disposed on an outer periphery of the conductive core, a horn-shaped opening is disposed inside the channel, a first abutment surface is disposed in the channel and a second abutment surface is disposed in the conductive core, a positioning through hole is disposed in the channel, an outer peripheral surface of the conductive core and an inner wall of the positioning through hole cooperate with each other, when the conductive core is inserted into the channel, the horn-shaped opening abuts against an outer side of the outwardly-tilted spring so that the outwardly-tilted spring is elastically deformed toward an inner side of the conductive core, after the conductive core is further pushed to enable the outwardly-tilted spring to pass through the horn-shaped opening, the outwardly-tilted spring returns to an outwardly-tilted state under an action of elastic force of the outwardly-tilted spring, and when the conductive core is pulled, the outwardly-tilted spring abuts against an end face of the horn-shaped opening, so that the conductive core is prevented from being pulled out.

2. The connector according to claim 1, wherein the fastening structure further comprises:

a nut fastened to an outer periphery of the housing; and a shoulder disposed on the outer periphery of the housing, and a gap configured to clamp the panel is formed between the nut and the shoulder.

3. The connector according to claim 2, wherein the fastening structure comprises the nut and a protrusion is disposed on an end face of the nut that faces away from the shoulder.

4. The connector according to claim 3, wherein a plurality of protrusions is evenly distributed around an axis of the nut.

5. The connector according to claim 3, further comprising:

a tool configured to rotate the nut; and a groove is disposed on the tool and configured to be inserted into the protrusion on the nut.

6. The connector according to claim 5, wherein the tool is constructed as a cylindrical structure, and the groove on the tool is disposed on one end face of the cylindrical structure.

7. The connector according to claim 6, wherein an outer diameter of the tool is not greater than an outer diameter of the nut.

8. The connector according to claim 2, wherein the shoulder is configured as a flange that extends around the outer periphery of the housing.

9. The connector according to claim 2, further comprising:

a sealing ring disposed between the shoulder and the panel.

10. The connector according to claim 2, wherein the fastening structure is farther away from the first end of the housing than the shoulder.

11. The connector according to claim 1, wherein the conductive core is slidably disposed in the channel.

12. The connector according to claim 1, wherein a positioning rod is disposed on an end face of the first end of the housing, a positioning hole is disposed on the circuit board, and the positioning rod is inserted into the positioning hole.

13. The connector according to claim 12, wherein the positioning rod and the positioning hole are connected by using an interference fit.

14. The connector according to claim 1, wherein the first connection portion is configured as a snap hook or a snap hole.

15. The connector according to claim 1, wherein a second connection portion is disposed on the conductive core and configured to be connected to the second connector; and a flexible portion is further disposed on the conductive core, located between the second connection portion and the solder leg, and is configured to buffer force between the second connection portion and the solder leg.

16. An electronic device comprising the connector according to claim 1, wherein a through hole is disposed on the housing panel, the housing of the connector passes through the through hole, the circuit board and the first end of the housing of the connector are located on a first side of the housing panel, and the second end of the housing is located on a second side of the housing panel.

17. The connector of claim 14, wherein the first connection portion is configured as the snap hole and a snap hook of the second connector is configured to pass through the snap hole of the first connection portion.

18. The connector of claim 17, wherein a rear end face of the snap hook is configured to abut against an end face of the snap hole.

* * * * *